(12) United States Patent
Kashima

(10) Patent No.: US 7,936,157 B2
(45) Date of Patent: May 3, 2011

(54) SWITCHING POWER SUPPLY SYSTEM

(75) Inventor: Masato Kashima, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 234 days.

(21) Appl. No.: 12/155,105

(22) Filed: May 29, 2008

(65) Prior Publication Data
US 2008/0298105 A1     Dec. 4, 2008

(30) Foreign Application Priority Data

May 29, 2007  (JP) ................. 2007-141839
Apr. 3, 2008  (JP) ................. 2008-096720

(51) Int. Cl.
*G05F 1/40* (2006.01)
(52) U.S. Cl. ...................................... 323/282
(58) Field of Classification Search .............. 323/222, 323/265, 266, 282, 284–287, 299, 300; 363/52, 363/53, 84, 89, 125–127; 361/18
See application file for complete search history.

(56) References Cited

U.S. PATENT DOCUMENTS

| | | | | | |
|---|---|---|---|---|---|
| 4,837,495 | A | * | 6/1989 | Zansky | 323/222 |
| 5,325,258 | A | * | 6/1994 | Choi et al. | 361/87 |
| 5,818,707 | A | * | 10/1998 | Seong et al. | 363/89 |
| 6,611,131 | B2 | * | 8/2003 | Edwards | 323/282 |
| 7,605,574 | B2 | * | 10/2009 | Dearn et al. | 323/284 |

FOREIGN PATENT DOCUMENTS

JP          05-009187 U      2/1993

* cited by examiner

*Primary Examiner* — Matthew V Nguyen
(74) *Attorney, Agent, or Firm* — Rabin & Berdo, P.C.

(57) ABSTRACT

A switching power supply system, in which a DC voltage obtained by full-wave rectification of an AC voltage is turned on and off by a switching device, converted to a desired DC voltage and outputted, includes a slope compensating circuit and an overcurrent protecting circuit, and a full-wave rectified voltage inputted to a terminal Tm is subtracted from a reference voltage Vref inputted to a terminal Tr to produce a reference voltage waveform signal (OCP correction value) Vocp to eliminate the influence of slope compensation. The reference signal of the overcurrent protection circuit is varied by a signal having a reverse phased waveform relative to the phase of the full-wave rectified waveform. This enables highly accurate overcurrent protection with a net overcurrent protection level unaffected by the slope compensation varied by the input voltage when the system is operated in a current mode.

12 Claims, 5 Drawing Sheets

SWITCHING POWER SUPPLY SYSTEM

BACKGROUND OF THE INVENTION

1. Field of the Invention

The present invention relates to a switching power supply system which converts a DC voltage, obtained by full-wave rectification of an AC voltage, to a desired DC voltage by carrying out turning-on and -off of the DC voltage obtained from the AC voltage by means of a switching device and outputs the converted DC voltage. The invention particularly relates to a switching power supply system in which a power factor improving operation is carried out in. current mode control.

2. Description of the Background

In a switching power supply system in which a power factor improving operation is carried out in current mode control, a DC voltage obtained by full-wave rectification of the voltage of an AC (Alternating Current) power supply is taken as an input voltage, and control is carried out so that the waveform of a current flowing in an inductor in the switching power supply system becomes a waveform proportional to (and in phase with) the voltage waveform of the input voltage, so that the power factor is improved.

An example of the configuration of such a switching power supply system in which a power factor improving operation is carried out is shown in FIG. 4. FIG. 4 is a diagram showing an example of the configuration of a step-up type switching power supply system in which a power factor improving operation is carried out in current mode control (a method of detecting the magnitude of a current flowing in a switching device to carry out control on the basis of the result of the detection). Current mode control is a control method applied in the case when monitoring of the peak value of a current flowing in a switching device is necessary, such as in overcurrent control. In FIG. 4, a diode bridge DB carries out full-wave rectification of the voltage of a AC power supply AC. A switching power supply, in which a DC voltage Vin obtained by the full-wave rectification of the AC voltage of the AC power supply AC with the diode bridge DB is taken as an input voltage, has an input capacitor Ci, an inductor L1, a transistor $Q_{SW}$ as a switching device, a diode D1 as a commutating device, an output capacitor Co, a resistor Rs as a current detecting element, a resistor Rfilt and a capacitor Cfilt forming a filter circuit, an output terminal Vout (the output voltage at the terminal is also referred to as Vout) and a terminal GND (a terminal at the ground potential), voltage dividing resistors R20 and R21 for dividing the output voltage Vout, voltage dividing resistors R30 and R31 for dividing the full-wave rectified DC voltage Vin as the output of the diode bridge DB, a power supply controlling IC (Integrated Circuit) 10, and a resistor Rcomp and capacitors Ccomp1 and Ccomp2 forming a phase compensation circuit.

In the switching power supply system, the energy stored in the inductor L1 when the switching device $Q_{SW}$ is turned-on is released through the diode D1 from the inductor L1 to the outside including the output capacitor Co when the switching device $Q_{SW}$ is turned-off thereby to realize a step-up operation (the operation of a step-up type switching power supply system is well-known, so that a detailed explanation of the system will be omitted). The input capacitor Ci is for removing ripples associated with the switching of the switching device $Q_{SW}$. The current flowing in the switching device $Q_{SW}$ flows in the resistor Rs as it is to develop a voltage (a current detecting signal), which is proportional to the current flowing in the switching device $Q_{SW}$, across the resistor Rs. The current detecting signal, with the noise associated with the switching of the switching device $Q_{SW}$ removed by passing through the filter circuit formed with the resistor Rfilt and the capacitor Cfilt, is inputted to an input terminal IS of the power supply controlling IC 10. Moreover, the voltage, into which the output voltage Vout is divided by the voltage dividing resistors R20 and R21, is inputted to an input terminal FB of the power supply controlling IC 10. The voltage into which the full-wave rectified DC voltage Vin is divided by the voltage dividing resistors R30 and R31, is inputted to an input terminal MUL. An output terminal OUT of the power supply controlling IC 10 is connected to the gate of the switching device $Q_{SW}$ for controlling the on and off of the switching device $Q_{SW}$ by the output signal from the output terminal OUT.

The power supply controlling IC 10 has a flip-flop FF1, a set voltage circuit V10 (the set voltage as its output is also referred to as V10), an error amplifier OP3 amplifying the difference between the signal inputted to the input terminal FB and the set voltage V10, a multiplication circuit 1 to which the output of the error amplifier OP3 and the signal from the input terminal MUL are inputted, a driver 2, an overcurrent protecting circuit 3 outputting a reference signal for deciding an overcurrent so as to carry out overcurrent protection, a slope compensating circuit 4 generating a monotonously increasing signal (a slope compensating signal) to output a signal as a (weighted) sum of the slope compensating signal and the current detecting signal for carrying out later explained slope compensation, an oscillator 5 for setting the flip-flop FF1 at periodic intervals, and a PWM comparator CP1 comparing lower one of the voltage of the reference signal (voltage signal) outputted from the overcurrent protecting circuit 3 and the output voltage of the multiplication circuit 1 with the output voltage of the slope compensating circuit 4. The output terminal of the error amplifier OP3 is also connected to a terminal COMP of the power supply controlling IC 10, on the outside of which the phase compensation circuit, formed of the resistor Rcomp and the capacitors Ccomp1 and Ccomp2, of the error amplifier OP3 is connected to the terminal COMP. Since the switching power supply system is operated so that two signals inputted to the error amplifier OP3 become equal to each other, the output voltage Vout becomes a voltage with the value for which the value of the set voltage V10 is multiplied by the reciprocal of the voltage dividing ratio provided by the voltage dividing resistors R20 and R21. The flip-flop FF1 is set by the oscillator 5 at periodic intervals and reset at the time when the output voltage of the slope compensating circuit 4 becomes higher than the lower one of the voltage of the reference signal outputted from the overcurrent protecting circuit 3 and the voltage of the output of the multiplication circuit 1. The output Q of the flip-flop FF1 is inputted to the gate of the switching device $Q_{SW}$ through the driver 2 and the output terminal OUT to control the turning-on and -off of the switching device $Q_{SW}$. Ordinary control is carried out by comparing the output of the multiplication circuit 1 and the output of the slope compensating circuit 4 to operate the whole circuit so that the output signal of the slope compensating circuit 4 based on the current detecting signal becomes identical with the output of the multiplication circuit 1 proportional to the voltage with a waveform of full-wave rectification of an AC voltage, by which a power factor is made improved. Moreover, when the output of the multiplication circuit 1 becomes excessive, the reference signal outputted from the overcurrent protecting circuit 3 prevents the current flowing in the switching device from becoming excessive. In current mode control, when a ON duty (=on-duration/switching period (=on-duration+off-duration)) of the switching device $Q_{SW}$ is 50% or more, subharmonic oscillation sometimes occurs to cause the operation to be unstable. As a measure for improving the operation becoming thus unstable, slope compensation is provided.

In the following, subharmonic oscillation and slope compensation will be explained. First, when the switching power supply system is in a stable state or in an equilibrium state, an increase in an on-duration and a decrease in an off-duration in the current in the inductor L1 are equal to each other. Moreover, the ON duty being 50% or more means that the increasing rate (m1) in the current in the inductor L1 in an on-duration (between certain times t1 and t2) is smaller than the absolute value (m2) of the decreasing rate (−m2) in the current in the inductor L1 in an off-duration (between the time t2 and a certain time t3), i.e. m1<m2. Here, consider the case in which the value of the current in the inductor L1 at the time t3 deviates from that at the time t1. The value of the current in the inductor L1 at the time t3 is equivalent to the value of the current in the inductor L1 at the time t1 in the next switching period. However, it is shown that when m1 and m2 are in a relation expressed as m1<m2, the deviation between the value of the current at the time t1 in a certain switching period and the value of the current at the time t1 in the next switching period increases (see JP-A-2004-40856, for example). This is known as a subharmonic oscillation. Conversely, with m1>m2, the deviation in the value of the current at the time t1 decreases in each switching period, so that the subharmonic oscillation can be inhibited. Therefore, for reversing a relation originally being m1<m2, a slope compensating signal (its inclination or its differentiation about time is taken as m3) produced by the slope compensating circuit 4 is added to a current detecting signal (with the inclination m1) to satisfy m1+m3>m2, by which the occurrence of a subharmonic oscillation is inhibited. This is known as slope compensation. The switching power supply system, which converts a DC voltage by means of a switching device to a desired DC voltage to output the converted DC voltage, is also provided with an over voltage protection circuit in addition to the overcurrent protection circuit for protecting the circuit in the system from an abnormal state.

Moreover, a proposal is also presented, in which, in a switching power supply system in which a power factor improving operation is carried out, even when the inputted voltage is high, reduction in power factor due to slope compensation is suppressed (see JP-UM-A-5-9187, for example) When the switching power supply system is formed of a step-up converter and when the slope compensating signal amplitude is fixed, the power factor sometimes is impaired more in a 200V input voltage system than in a 100V input voltage system. If the input voltage to the step-up converter is expressed by Vin and the output voltage from the step-up converter by Vout, the ON duty will be given by (Vout−Vin)/Vout. In other words, if the switching frequency is the same, the on-duration will be longer in the 100V input voltage system than in the 200V input voltage system. Since the increasing rate of the current flowing through the inductance L1 is proportional to the input voltage Vin, the increment of the current flowing through the inductance L1 in one on-duration is proportional to A=Vin·(Vout−Vin)/Vout. The current increment is large in the 100V input voltage system and small in the 200V input voltage system depending on the value of the output voltage Vout. If the output voltage Vout is 250V, the above-described A is 60 for the input voltage Vin of 100V and 40 for the input voltage Vin of 200V. If the slope compensating signal amplitude is fixed in the state, in which the increment of the current flowing through the inductance L1 is small under a high input voltage, the ratio of the slope compensating signal to the current detecting signal will be higher in the 200V input voltage system than in the 100V input voltage system. Therefore, the power factor is impaired more badly in the 200V input voltage system than in the 100V input voltage system. As a countermeasure against impairing the power factor, the power supply system disclosed in JP-UM-A-5-9187 employs different slope compensating signal amplitudes for the respective 100V and 200V input voltage systems. The slope compensating signal amplitude for the 100V input voltage system is set to be different from the slope compensating signal amplitude for the 200V input voltage system so that the ratio of the slope compensating signal to the current detecting signal in the output signal from the slope compensating circuit 4 may not be high in the 200V input voltage system.

In a related switching power supply system in which a power factor improving operation is carried out, when the system is operated in a current mode, a slope detecting signal was simply added to a current detecting signal in a power factor improving circuit. However, in the related switching power supply system described above, when the system was operated in a current mode, the slope compensating signal, monotonously increasing in the duration in which the switching device was turned on, was added to the current detecting signal in the power factor improving circuit. This has caused an overcurrent protection level to vary depending on an input voltage to be a problem of degrading accuracy of the overcurrent protection. This will be explained with reference to FIG. 5. FIGS. 5A and 5B are views illustrating the comparison carried out by the PWM comparator CP1 shown in FIG. 4. The comparison is carried out about the output of the slope compensating circuit 4 and the reference signal Vocp outputted from the overcurrent protecting circuit 3. In this case, the voltage of the output of the multiplication circuit 1 is to be higher than the voltage of the reference signal Vocp. As was explained in the foregoing, the PWM comparator CP1 compares the lower one of the voltage of the reference signal Vocp and the output voltage of the multiplication circuit 1 with the output voltage of the slope compensating circuit 4. Therefore, the output of the multiplication circuit 1 is negligible in the following explanation. FIG. 5A shows the case in which the input voltage Vin (equivalent to the output voltage of the diode bridge DB) to the switching power supply system is low and FIG. 5B shows the case in which the input voltage Vin is high (two times the voltage in the case shown in FIG. 5A). In the figures, a thin solid line represents a monotonously increasing current detecting signal and a thick solid line represents an output signal of the slope compensating circuit 4 as a sum of a monotonously increasing current detecting signal and a monotonously increasing slope compensating signal. The difference between the value represented by the thick solid line and the value represented by the thin solid line is equivalent to an amount of slope compensation. In the system, even though the level of the current detecting signal in (a) and that in (b) are equal to each other at the time when the switching device $Q_{SW}$ is turned on, the level of the current detecting signal when the level of the output of the slope compensating circuit 4 reaches the level of the reference signal Vocp to be decided that an overcurrent is detected in FIG. 5A becomes different from that in FIG. 5B. Therefore, to the reference signal Vocp of the same level, currents with their levels different from each other are decided as being overcurrents.

Specifically, the current flowing in the switching device $Q_{SW}$ is the current $I_{L1}$ flowing in the inductor L1. Thus, when the on-resistance and the resistance Rs (Rs is low) of the switching device $Q_{SW}$ is neglected, the increasing rate of the current $I_{L1}$ flowing in the inductor L1 is proportional to the input voltage Vin ($L1(dI_{L1}/dt)=Vin$). Therefore, as the input voltage Vin becomes higher, the output of the slope compensating circuit 4 reaches the level of the reference signal Vocp in a shorter time. Since the inclination of the slope compensating signal is independent of the input voltage Vin, as the time that elapses until the level of the output of the slope compensating circuit 4 reaches the level of the reference signal Vocp becomes shorter, the amount of the slope compensation, equivalent to the length between two arrows shown in FIG. 5, becomes smaller. The value of the net current detecting signal when it is decided that an overcurrent is detected is given as a difference obtained by subtracting an amount of slope compensation from the level of the reference signal Vocp. Therefore, the net current detecting signal becomes lower as the input voltage becomes lower. Thus, to the same level of the reference signal, currents with different values are decided to be overcurrents. In the power factor improving circuit, the use of a voltage, having a waveform obtained by full-wave rectification of the commercial AC, as the input causes the input voltage to be not constant. Thus, when the input voltage is low, an overcurrent protection level (the level of a net current detecting signal decided as being an overcurrent) becomes low. While, when the input voltage is high, the overcurrent protecting level becomes high. Moreover, an explanation from another view point will be given as follows. As was explained in the foregoing, the value of the net current detecting signal when it is decided that an overcurrent is detected is given as a difference obtained by subtracting an amount of slope compensation from the level of the reference signal Vocp. Therefore, as the time that elapses until the level of the output of the slope compensating circuit 4 reaches the level of the reference signal Vocp (the time during which the switching device $Q_{SW}$ is turned on) becomes longer, the amount of the slope compensation becomes larger to cause the value of the net current detecting signal to become smaller. When the input voltage is low, the ON duty is large (The ON duty is expressed as (1−Vin/Vout) in a step-up type switching power supply and (Vin/Vout) in a step-down type switching power supply, for example. The expressions relate to the current $I_{L1}$ flowing in the inductor L1 and are obtained from the fact that the amount of increase in the $I_{L1}$ in an on-duration is equal to the amount of decrease in an off-duration. However, the detailed explanation about them will be omitted.) to make an on-period long (the switching period is constant independently of the input voltage Vin). When the input voltage is high, the ON duty is small to make the on-period short. Therefore, with the overcurrent protection level (the level of the reference signal Vocp) being constant, the lower the input voltage is, the higher the probability becomes that the time becomes longer that elapses until the level of the output of the slope compensating circuit 4 reaches the level of the reference signal Vocp, that is, the higher the probability becomes that the time becomes longer during which the switching device is turned on. Hence, the level of the net current detecting signal relating to overcurrent protection is liable to become small.

The invention was made in view of such points with an object of providing a switching power supply system that is capable of performing highly accurate overcurrent protection with the overcurrent protection level being independent of (unaffected by) an input voltage when the system is operated in a current mode.

SUMMARY OF THE INVENTION

In the invention, for solving the foregoing problem, there is provided a switching power supply system, in which a DC voltage obtained by full-wave rectification of an AC voltage is turned on and off by a switching device to be converted to a desired DC voltage and outputted. In the switching power supply system, it is characterized in that the system includes a current detecting unit detecting a current flowing in the switching device, a slope compensating circuit generating a slope compensating signal monotonously increasing, and an overcurrent protecting circuit detecting an overcurrent for carrying out overcurrent protection by performing a comparison of a signal as a sum of a current detecting signal as the output of the current detecting unit and the slope compensating signal with a reference signal, or by performing a comparison of the current detecting signal with a signal as a difference obtained by subtracting the slope compensating signal from the reference signal, and that the overcurrent protecting circuit varies the level of the reference signal by a signal having a waveform with the phase thereof reversed to the phase of the waveform of the full-wave rectification of the AC voltage.

In a related switching power supply system, the level of the reference signal Vocp is fixed. Thus, as the input voltage Vin is made lower, the time that elapses until the level of the output of the slope compensating circuit reaches the level of the reference signal Vocp becomes longer to increase the amount of slope compensation, which makes the level of a net current detecting signal small. For compensating this, according to the switching power supply system of the invention, with the level of the reference signal in the overcurrent protecting circuit made varied by a signal having a waveform with the phase thereof reversed to the phase of a waveform of the full-wave rectification, an increment of the amount of slope compensation when the input voltage Vin is low is added to a fixed value of the overcurrent protecting circuit to be provided as a reference value. Therefore, when the system is operated in a current mode that necessitates the slope compensation, highly accurate overcurrent protection becomes possible with the net overcurrent protection level being unaffected by an input voltage.

DESCRIPTION OF THE PREFERRED EMBODIMENTS

Figure 4:
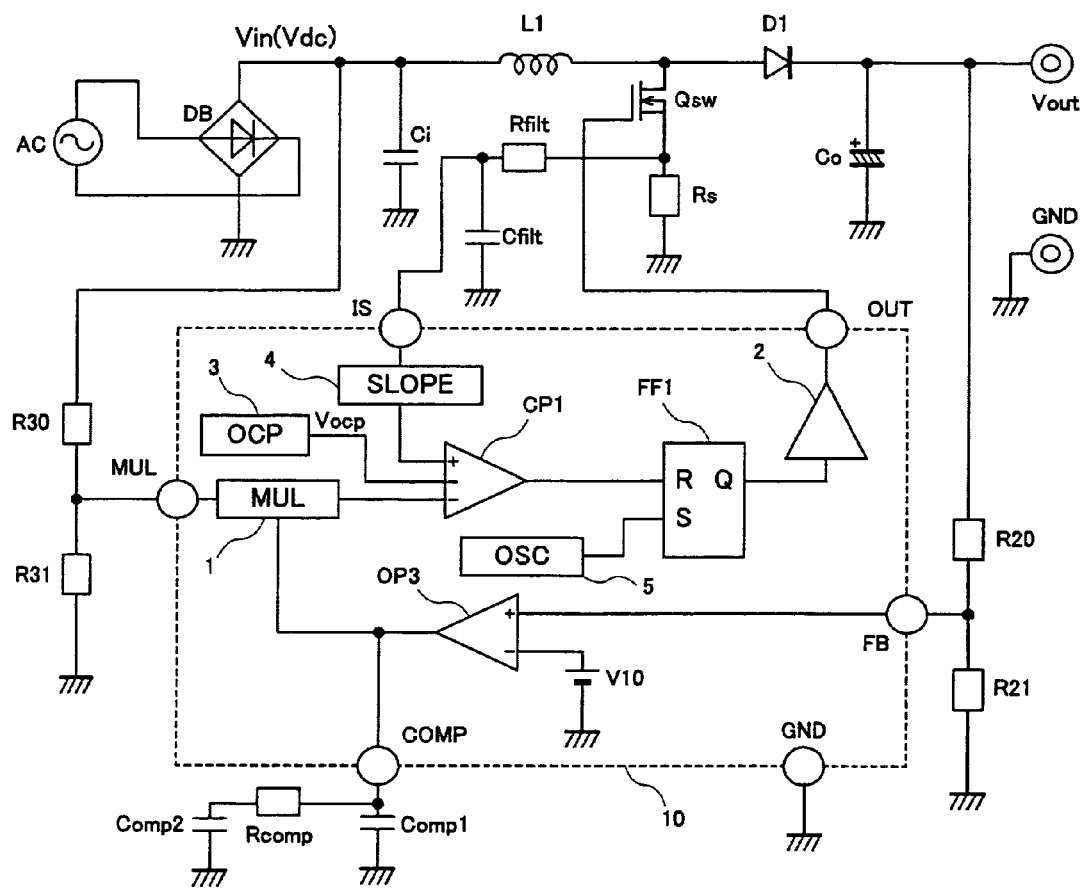
FIG. 4 is a diagram showing an example of the configuration of a step-up type switching power supply system in which a power factor improving operation is carried out in current mode control.
Figure 5:
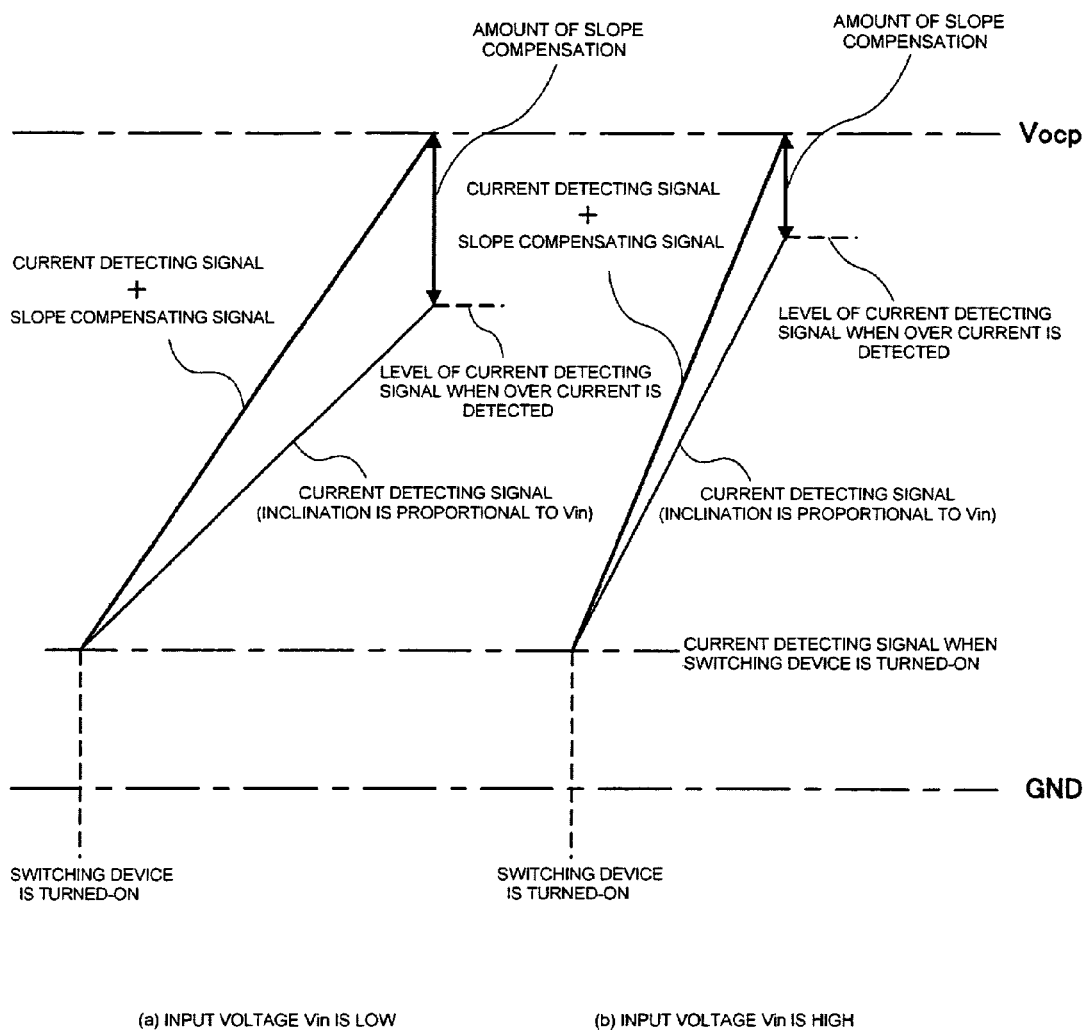
FIGS. 5A and 5B are views showing the variation in the overcurrent protection level when an input voltage is varied.

In the following, an embodiment of the invention will be explained with reference to the drawings. In the following, parts common to those shown in FIG. 4 are designated by the same reference numerals and signs as those in FIG. 4 and detailed explanations thereof will be omitted. The switching power supply system according to the embodiment is, as shown in FIG. 4, a step-up type converter in which a DC voltage, obtained by full-wave rectification of an AC voltage carried out by means of a diode bridge DB, is turned-on and -off by a MOSFET as a switching device to be converted to a desired DC voltage and outputted. The switching power supply system is provided with a slope compensating circuit and an overcurrent protection circuit to vary a reference signal in the overcurrent protection circuit by means of a signal having a voltage waveform with its phase reversed to the phase of the voltage waveform of the full-wave rectification. Namely, a voltage waveform is produced by dividing the voltage with the waveform of the full-wave rectification by means of the voltage dividing resistors R30 and R31 shown in FIG. 4 to determine a correction value for overcurrent protection according to the waveform of the divided voltage.

Table 1 is a calculation table showing that the switching power supply system according to the invention enables the realization of elimination of the influence of the slope compensation with the net OCP value to the current detecting signal taken as 0.8V, in which value the influence of the slope compensation is eliminated. Here, there are shown the phase φ (deg.) of an input voltage, the input voltage (Vdc, the value at the respective phases of the output voltage Vin of the diode bridge), a duty ratio (a ON duty), an on-time (on-duration) (μs), an amount of slope compensation (V), an OCP correction value Vocp (V) and the OCP value (V) (the net value in which the influence of the slope compensation is eliminated). The value of the signal Vmul is a value for which the value of the input voltage Vdc is multiplied by a voltage dividing ratio given by the voltage dividing resistors R30 and R31.

TABLE 1

| PHASE φ (DEG) | INPUT VOLTAGE | DUTY RATIO | ON TIME (μs) | AMOUNT OF SLOPE COMPENSATION (V) | OCP CORRECTION VALUE (V) | OCP VALUE |
|---|---|---|---|---|---|---|
| 0 | 0 | 1 | 15.38462 | 0.615384615 | 1.42 | 0.804615 |
| 10 | 24.55756 | 0.938606 | 14.44009 | 0.577603753 | 1.382181356 | 0.804578 |
| 20 | 48.36895 | 0.879078 | 13.52427 | 0.540970842 | 1.345511813 | 0.804541 |
| 30 | 70.71068 | 0.823223 | 12.66497 | 0.506598957 | 1.311105556 | 0.804507 |
| 40 | 90.9039 | 0.77274 | 11.88831 | 0.475532468 | 1.280008001 | 0.804476 |
| 50 | 108.335 | 0.729162 | 11.21788 | 0.448715317 | 1.253164032 | 0.804449 |
| 60 | 122.4745 | 0.693814 | 10.67406 | 0.426962327 | 1.23138929 | 0.804427 |
| 70 | 132.8926 | 0.667768 | 10.27336 | 0.410934454 | 1.215345388 | 0.804411 |
| 80 | 139.2728 | 0.651818 | 10.02797 | 0.401118695 | 1.205519814 | 0.804401 |
| 90 | 141.4214 | 0.646447 | 9.945332 | 0.397813298 | 1.202211111 | 0.804398 |
| 100 | 139.2728 | 0.651818 | 10.02797 | 0.401118695 | 1.205519814 | 0.804401 |
| 110 | 132.8926 | 0.667768 | 10.27336 | 0.410934454 | 1.215345388 | 0.804411 |
| 120 | 122.4745 | 0.693814 | 10.67406 | 0.426962327 | 1.23138929 | 0.804427 |
| 130 | 108.335 | 0.729162 | 11.21788 | 0.448715317 | 1.253164032 | 0.804449 |
| 140 | 90.9039 | 0.77274 | 11.88831 | 0.475532468 | 1.280008001 | 0.804476 |
| 150 | 70.71068 | 0.823223 | 12.66497 | 0.506598957 | 1.311105556 | 0.804507 |
| 160 | 48.36895 | 0.879078 | 13.52427 | 0.540970842 | 1.345511813 | 0.804541 |
| 170 | 24.55756 | 0.938606 | 14.44009 | 0.577603753 | 1.382181356 | 0.804578 |

Figure 1:
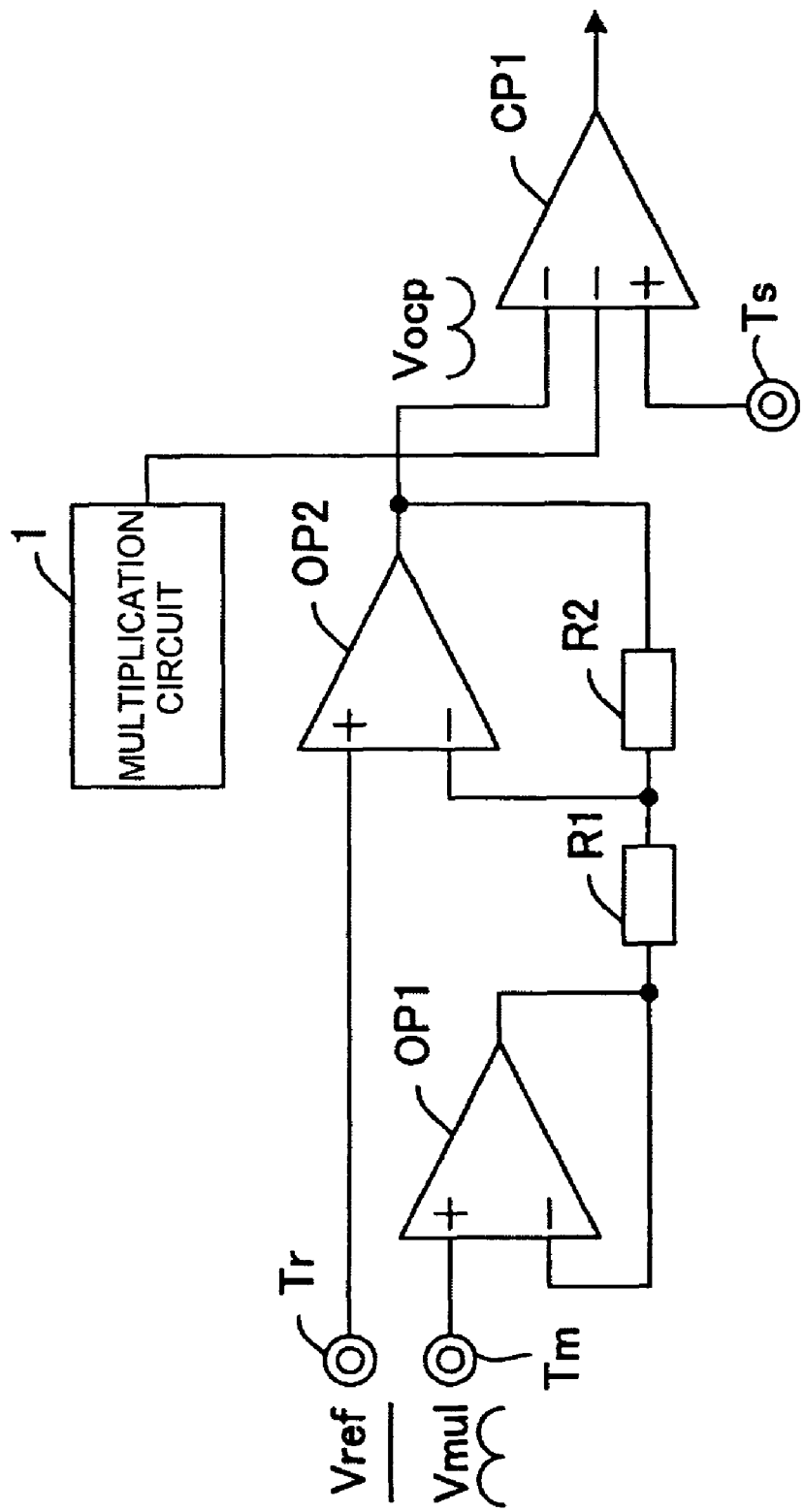
FIG. 1 is a circuit diagram showing the principal part of the switching power supply system according to an embodiment of the invention.

FIG. 1 is a circuit diagram showing the principal part of the switching power supply system according to a preferred embodiment of the invention. In FIG. 1, reference numeral 1 denotes a multiplication circuit and signs R1 and R2 denote resistors. An operational amplifier OP1 forms a voltage follower and an operational amplifier OP2 forms a subtraction circuit together with the resistors R1 and R2. Moreover, a PWM comparator CP1 is provided which outputs a driving signal to the MOSFET as the switching device. A signal Vmul of a divided voltage with a full-wave rectified waveform is inputted to a terminal Tm. A reference voltage Vref with a constant voltage is inputted to a terminal Tr. By means of the subtraction circuit formed by the operational amplifier OP2 and the resistors R1 and R2, a value, for which the value of the signal Vmul is multiplied by a magnification of an input correction, is subtracted from the value of the reference voltage Vref. This allows a reference voltage waveform signal (OCP (Overcurrent Protection) correction value signal) Vocp to be obtained which relates to overcurrent protection and is capable of eliminating the influence of the slope compensation. Namely, the voltage signal Vocp can be obtained as a signal varying with a waveform with its phase reversed to the phase of the voltage waveform of the full-wave rectification of the AC voltage by means of the diode bridge DB. Moreover, a terminal Ts is connected to the output terminal of an unillustrated slope compensating circuit. From the terminal Ts, a current detecting signal is inputted to which a slope compensating signal is added.

The way of obtaining data shown in Table 1 is as follows. First, letting the resistance values of the resistors R1 and R2 shown in FIG. 1 be also represented as R1 and R2, respectively, the value of the reference voltage waveform signal Vocp is expressed by the following expression.

$$Vocp=((R1+R2)/R1)\times Vref-(R2/R1)\times Vmul$$

In this equation, the values of R1 and R2 and Vref are determined so that the magnification of an input correction (R2/R1) becomes 0.00154, and the value of Vocp when Vmul is Vmul=0, given as Vocp=((R1+R2)/R1)×Vref=1.00154Vref≈Vref, becomes 1.42V. Moreover, letting a commercial frequency AC voltage be 100 Vac (namely, the waveform of the input voltage Vin (Vdc) subjected to the full-wave rectification is expressed as √2×100|sin φ|), a voltage dividing ratio by means of the previously explained voltage dividing resistors R30 and R31 be 1 (i.e. Vmul=Vdc) for simplifying the explanation, an output voltage be 400 VDC, a switching frequency fsw be 65 kHz (the corresponding period being 15.38462 μs) and the inclination of a slope compensating signal (a slope value) be 40 mV/μs, the above expression becomes Vocp=1.42−0.00154×Vdc, the duty ratio (the ON duty) becomes 1−Vdc/400, and the amount of the slope compensation becomes 0.04 (40 mV/μs)×on-duration (15.38462 μs×ON duty). In addition, the net OCP value (V) for which the influence of slope compensation is eliminated from a reference voltage waveform signal Vocp as an OCP correction value can be obtained by calculating (Vocp −(amount of slope correction)). As is known from Table 1, in the switching power supply system according to the invention, the net OCP value can be made constant by eliminating the influence of the slope compensation.

More specifically, the ON duty can be obtained by the expression 1−Vin/Vout as explained above. Thus, the ON duty becomes larger as the input voltage becomes lower to make the on-duration become longer. The value of the amount of slope compensation is a value for which the value of the slope 40 mV/μs is multiplied by the on-duration. Moreover, as is expressed by the above expression about the OCP correction value Vocp, the OCP correction value Vocp is given by subtracting a signal, for which the signal Vmul with the waveform of the full-wave rectification is multiplied by a magnification of an input correction, from the reference voltage Vref. Thus, the OCP correction value Vocp is to have a waveform with the phase reversed to the phase of the waveform of the full-wave rectification of the inputted AC voltage. Therefore, when the input voltage is low and the on-time is long for the amount of slope compensation being large, the OCP correction value Vocp is made large and, when the input voltage is high and the on-time is short for the amount of slope compensation being small, the OCP correction value Vocp is made small, by which the substantial (net) OCP value is made constant.

In this way, in the preferred embodiment, the level of the reference signal of the overcurrent protection circuit is made varied by the signal having a waveform with the phase reversed to the phase of the waveform of the full-wave rectification of the inputted AC voltage. This enables the switching power supply system to carry out highly accurate overcurrent protection with the substantial (net) overcurrent protection level made constant without being affected by the amount of slope compensation varied by an input voltage when the switching power supply system is operated in a current mode.

Figure 2:
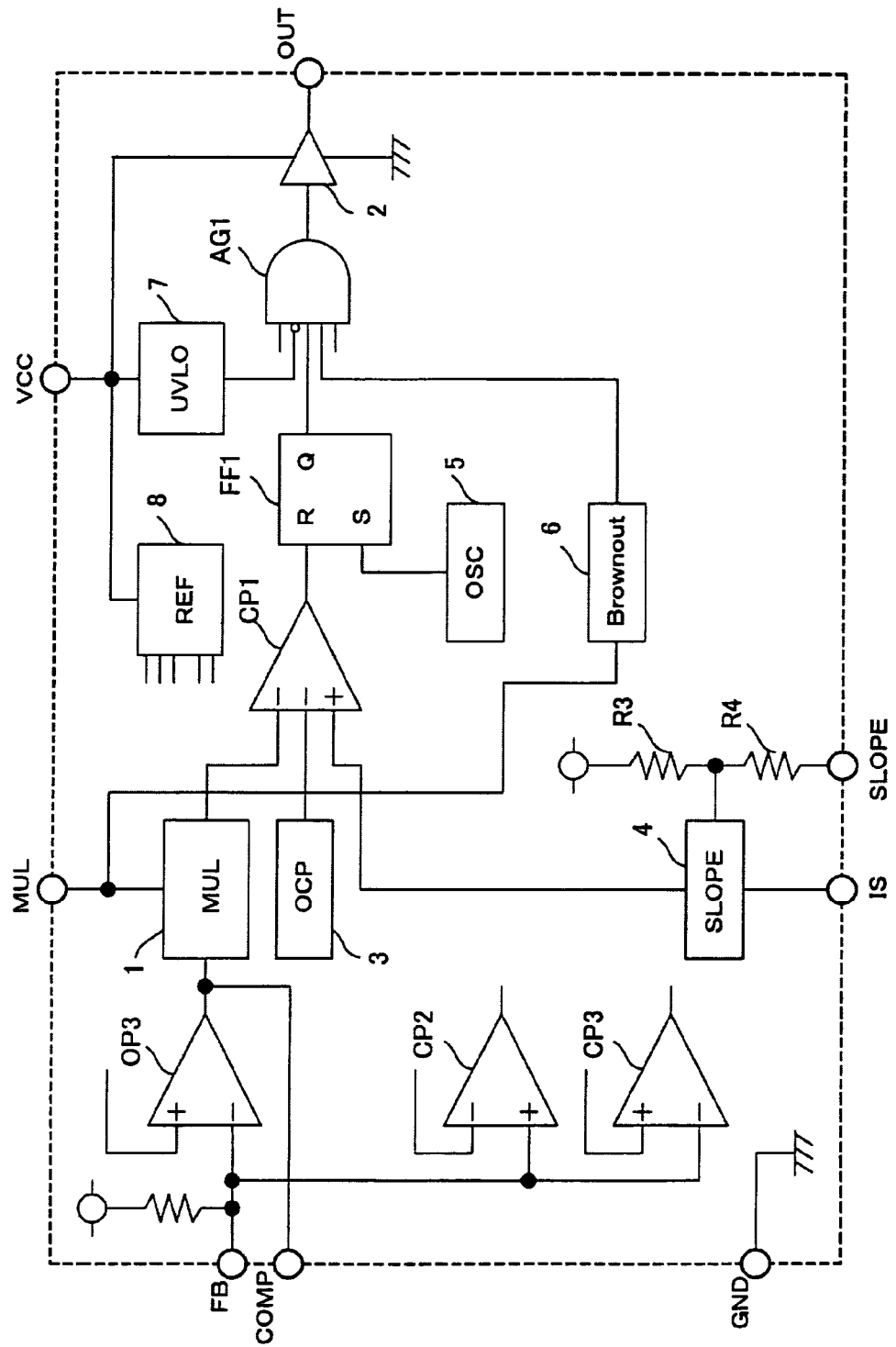
FIG. 2 is a block diagram showing the whole configuration of the control circuit of the switching power supply system according to the preferred embodiment.

FIG. 2 is a block diagram showing the whole configuration of the control circuit of the switching power supply system according to the embodiment. The control circuit is formed into an IC (Integrated Circuit). The output of an error amplifier OP3 is inputted to the PWM comparator CP1 through the multiplication circuit 1. The output of the PWM comparator CP1 is transmitted to a driver 2 through a flip-flop FF1 and an AND gate AG1 to be outputted from the driver 2 as a driving signal to an unillustrated external MOSFET. To the PWM comparator CP1, output signals from an overcurrent protection circuit (OCP) 3 and a slope compensating circuit 4 are inputted. To the set terminal S of the flip-flop FF1, the output from an oscillator 5 is inputted. The overcurrent protection circuit (OCP) 3 is a section except the multiplication circuit 1 and the PWM comparator CP1 of the circuit shown in FIG. 1. The control circuit is further provided with a Brownout circuit 6, a UVLO 7 and a power supply 8 supplying a driving voltage and a reference voltage to all parts of the control circuit. Although the detailed explanations about the Brownout circuit 6 and the UVLO 7 will be omitted because they are in no direct relation to the invention, both of them are circuits for preventing malfunctions from occurring when a power supply voltage fed to the control circuit provided as an IC (Integrated Circuit) is lowered. Each of signs CP2 and CP3 denotes a comparator formed of an operational amplifier and signs R3 and R4 denote resistors for determining the temporal inclination (slope value) of the slope compensating signal.

Moreover, as external terminals, the control circuit has a terminal FB to which the feed back signal of the output voltage is inputted, a terminal COMP for the phase compensation of the error amplifier OP3, an input terminal MUL for shaping an input current to have a waveform of full-wave rectification of a sinusoidal wave in phase with the AC input voltage Vdc, a terminal IS to which a detecting signal of the value of the current of the MOSFET (a current detecting signal) is inputted, a terminal SLOPE for the slope compensation, a (grounding) terminal GND, a terminal OUT for outputting the driving signal of the MOSFET and a terminal VCC to which the power supply voltage is inputted. As was explained before, from the slope compensating circuit 4, the signal, in which the slope compensating signal is added to the current detecting signal, is outputted.

The control circuit with the configuration described above is for controlling a step-up type power factor improving converter, for example, with a switching operation and a power factor improving operation being the basic operations of the circuit. The invention is not limited to the step-up type switching power supply but can be applied to a step-down type switching power supply. To the terminal COMP, a phase compensation circuit such as a capacitor is connected as shown in FIG. 4, which circuit makes the output of the error amplifier OP3 approximately a DC voltage in a stable state. The voltage is inputted to the multiplication circuit 1. A voltage with a waveform of full-wave rectification of the (divided) AC input voltage is also inputted to the multiplication circuit 1. Thus, from the multiplication circuit 1, a signal (a voltage signal) is outputted whose voltage is proportional to a voltage with a waveform of full-wave rectification of the sinusoidal wave as that of the AC input voltage as a product of the two inputted voltages. The signal with the waveform of full-wave rectification of the sinusoidal wave is inputted to the PWM comparator CP1 as a reference of an inductor current. As a result, the waveform of the averaged inductor current flowing in the inductor L1 becomes a full-wave rectified sinusoidal wave in phase with the AC input voltage. Moreover, with the ripples in the inductor current due to switching removed by the input capacitor Ci shown in FIG. 4, the current flowing into the switching device from the AC (Alternating Current) power supply is made to have an approximately sinusoidal-wave-like waveform to be capable of improving a power factor.

Figure 3:
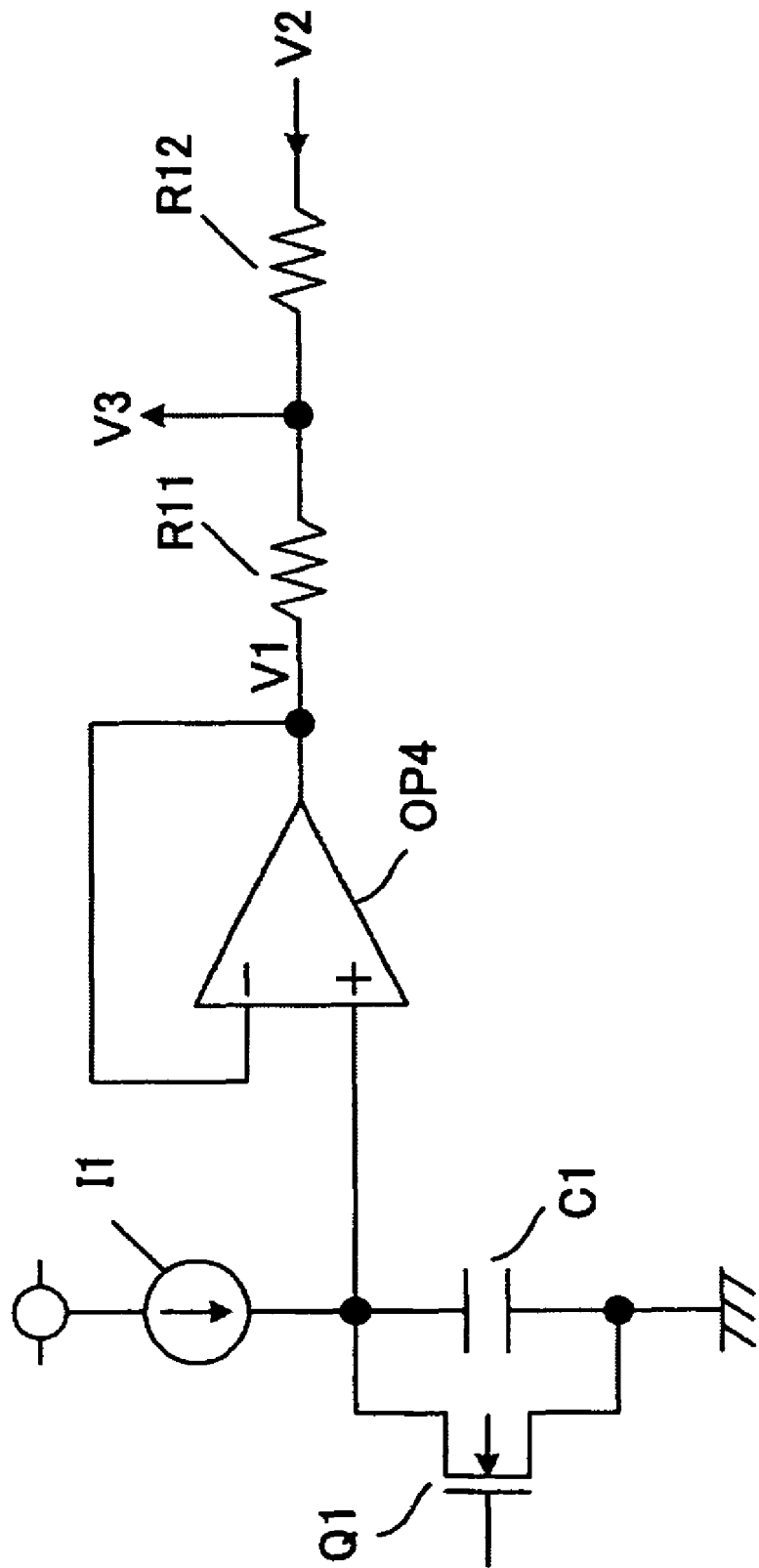
FIG. 3 is a diagram showing an example of the configuration of the slope compensating circuit according to the embodiment.

FIG. 3 is a diagram showing an example of the configuration of the slope compensating circuit 4 according to the preferred embodiment. A MOSFET Q1 is connected to a constant current source I1 with a capacitor C1 connected between the source and the drain and a signal from the oscillator 5 inputted to the gate. With the MOSFET Q1 turned on by the signal from the oscillator 5 to reset (discharge) the capacitor 1 before being turned off, the capacitor C1 carries out integration of the constant current from the constant current source I1 to bring the voltage across the capacitor C1 into a monotonously increasing signal. The integrated voltage signal is equal to the slope compensating signal. The integrated voltage across the capacitor C1 is inputted to a voltage follower formed by an operational amplifier OP4 as an impedance conversion circuit. Then, a signal voltage V1 with its value equal to that of the integrated voltage across the capacitor C1 is applied from the output terminal of the operational amplifier OP4 to an end of a resistor R11. Moreover, a voltage V2 (the voltage of the current detecting signal) inputted from the terminal IS shown in FIG. 2 is applied to an end of a resistor R12 connected in series to the resistor R11 and, from the connection point of the resistors R11 and R12, a voltage V3 as a weighted average of the signal voltages V1 and V2 ($V3=(R11 \times V1+R12 \times V2)/(R11+R12)$) is outputted as the output signal of the slope compensating circuit 4.

The slope compensating circuit 4 is a circuit for inhibiting subharmonic oscillation from occurring by adding the slope compensating signal with a certain inclination to the current detecting signal as explained above. The magnitude of the constant current from the constant current source I1 is to determine the inclination (slope value) of the slope compensating signal. The constant current is produced on the basis of the value of a voltage to which the value of the voltage of the internal power supply is divided by means of the resistors R11 and R12 and unillustrated external resistors connected to the terminal SLOPE shown in FIG. 2. In addition, without adding the slope compensating signal to the current detecting signal for the comparison with the reference signal, also to compare the current detecting signal with a difference signal by subtracting the slope compensating signal from the output of the multiplication circuit 1 or from the reference voltage waveform signal (OCP correction value) Vocp, the realization of the same control can be achieved. While the present invention has been particularly shown and described with reference to a preferred embodiment thereof, it will be understood by those skilled in the art that the foregoing and other changes in form and details can be made therein without departing from the spirit and scope of the invention.

What is claimed is:

1. A switching power supply system in which a full-wave rectified voltage is turned on and off by a switching device to be converted to a desired DC voltage, the system comprising:
   a current detector configured to detect a current flowing in the switching device and to output a current detecting signal corresponding thereto;
   a slope compensating circuit configured to generate a monotonously increasing slope compensating signal; and
   an overcurrent protecting circuit configured to detect an overcurrent by performing a comparison among values of the current detecting signal, the slope compensating signal, and a reference signal, and to perform overcurrent protection according to a result of said comparison,
   wherein the reference signal has a waveform of opposite phase to the full-wave rectified voltage.

2. The switching power supply system as claimed in claim 1 wherein the overcurrent protecting circuit detects the overcurrent by performing a comparison of the value of the current detecting signal with a signal obtained by subtracting the value of the slope compensating signal from the value of the reference signal.

3. The switching power supply system as claimed in claim 2 wherein the waveform of the reference signal is produced by varying the level of the reference signal in opposite phase to a signal obtained by dividing the full-wave rectified voltage by employing voltage dividing resistors.

4. The switching power supply system as claimed in claim 2 wherein a correction value of the level of the reference signal is determined depending on a product of a slope of the monotonously increasing slope compensating signal and a time elapsed from turning-on of the switching device.

5. The switching power supply system as claimed in claim 1 wherein the waveform of the reference signal is produced by varying the level of the reference signal in opposite phase to a signal obtained by dividing the full-wave rectified voltage by employing voltage dividing resistors.

6. The switching power supply system as claimed in claim 1 wherein a correction value of a level of the reference signal is determined depending on a product of a slope of the monotonously increasing slope compensating signal and a time elapsed from turning-on of the switching device.

7. A method for overcurrent protection of a switching power supply system in which a full-wave rectified voltage is turned on and off by a switching device, converted to a desired DC voltage and outputted, the method comprising:
   detecting a current flowing in the switching device;
   generating a monotonously increasing slope compensating signal;
   detecting an overcurrent to carry out the overcurrent protection by summing the current flowing in the switching device and the slope compensating signal with a reference signal, and
   varying a level of the reference signal in opposite phase to a waveform of the full wave rectified voltage.

8. The method as claimed in claim 7 wherein detecting the overcurrent comprises comparing the current detecting signal with a signal obtained by subtracting the slope compensating signal from the reference signal.

9. The method as claimed in claim 8 wherein varying a level of the reference signal further comprises varying the reference signal in opposite phase to a signal obtained by dividing the full-wave rectified voltage by employing voltage dividing resistors.

10. The method as claimed in claim 8 further comprising determining a correction value of a level of the reference signal depending on a product of a slope of the monotonously increasing slope compensating signal and a time elapsed from turning-on of the switching device.

11. The method as claimed in claim 7 wherein varying a level of the reference signal further comprises varying the reference signal in opposite phase to a signal obtained by dividing the full-wave rectified voltage by employing voltage dividing resistors.

12. The method as claimed in claim 7 further comprising determining a correction value of a level of the reference signal depending on a product of a slope of the monotonously increasing slope compensating signal and a time elapsed from turning-on of the switching device.

* * * * *